United States Patent [19]

David

[11] Patent Number: 4,898,842

[45] Date of Patent: Feb. 6, 1990

[54] ORGANOMETALLIC-DERIVED CORDIERITE AND OTHER COMPOUNDS COMPRISING OXIDES OF SILICON

[75] Inventor: Lawrence D. David, Wappingers Falls, N.Y.

[73] Assignee: International Business Machines Corporation, Armonk, N.Y.

[21] Appl. No.: 97,397

[22] Filed: Sep. 14, 1987

Related U.S. Application Data

[63] Continuation of Ser. No. 835,498, Mar. 3, 1986, abandoned.

[51] Int. Cl.$^4$ ............................................. C03C 10/08
[52] U.S. Cl. ........................................ 501/9; 501/12; 501/119; 501/128; 501/153; 501/33
[58] Field of Search .................... 501/9, 12, 119, 153, 501/128, 33; 423/329, 331, 600

[56] References Cited

U.S. PATENT DOCUMENTS

| | | | |
|---|---|---|---|
| 3,640,093 | 2/1972 | Levene et al. | 65/134 |
| 4,028,085 | 6/1977 | Thomas | 65/134 |
| 4,217,240 | 8/1980 | Bergna | 423/328 X |
| 4,234,367 | 11/1980 | Herron et al. | 156/89 |
| 4,301,132 | 11/1981 | Kumar et al. | 174/68.5 |
| 4,340,436 | 7/1982 | Dubetsky et al. | 156/89 |
| 4,473,542 | 9/1984 | David | 423/594 |
| 4,486,401 | 12/1984 | Arons et al. | 423/594 |
| 4,698,317 | 10/1987 | Inoue et al. | 501/119 X |
| 4,764,486 | 4/1988 | Ishihara et al. | 501/9 |

FOREIGN PATENT DOCUMENTS 57-88075  6/1982  Japan .

OTHER PUBLICATIONS

Reichspatent 736411 (1939) (See "Sol–Gel: Science, Processes and Products", by Dislich).

Dislich, Angew. Chem. Int. Ed. Eng. 10. 363 (1971), entitled "New Routes to Multicomponent Oxide Glasses".

Mazdiyasni et al., Journal of the American Ceramics Society 50, 532 (1967), entitled "Cubic Phase Stabilization of Translucent Yttria–Zirconia at Very Low Temperatures".

Mazdiyasni, Ceramics International 8, 42 (1982), entitled "Powder Synthesis From Metal–Organic Precursors".

Courty et al., "Mixed Oxides and Oxide Solid Solutions in Highly Dispersed Form Obtained Through Pyrolysis of Amorphous Organic Precursors", Powder Technology 7, 21 (1973).

Baythoun et al., "Production of Strontium–Substituted Lanthanum Manganite Perovskite Powder by the Amorphous Citrate Process", by Journal of Materials Science 17, 2757 (1982).

Anderton et al., "production of Conducting Oxide Powders by Amorphous Citrate Process", Powder Metallurgy 1, 14, (1979).

Hirano et al., "Preparation and Properties of Mn, Zn-Ferrite Fine Particles by Hydrolysis of Organo–Metallic Compounds", American Ceramic Society Bulletin 61, 362 (1982).

Suwa et al., "Preparation of Spinel Ferrites by Hydrolysis of Metal Acetylacetonates", Proceedings of the International ICF, 3rd (48TRAI) 1980 (Pub. 1982), 23–26.

Holand et al., entitled "Crystallization of $SiO_2$–$Al_2O_3$–MgO Gel Glasses", Journal Non–Crystalline, Solids 48, 205 (1982).

*Primary Examiner*—Mark L. Bell
*Assistant Examiner*—Karl Group
*Attorney, Agent, or Firm*—Ira D. Blecker

[57] ABSTRACT

The present invention provides a method of synthesizing amorphous cordierite-forming glasses from organometallic precursors. Either the sol-gel/$\beta$-diketonate technique or the amorphous chelating hydroxycarboxylate process can be used advantageously. The method of the present invention can also be used to form 5 component comprised and 2 component comprised amorphous compositions wherein one of the components is an oxide of silicon.

33 Claims, 4 Drawing Sheets

ORGANOMETALLIC-DERIVED CORDIERITE AND OTHER COMPOUNDS COMPRISING OXIDES OF SILICON

This application is a continuation of Ser. No. 06/835,498, filed March 3, 1986, now abandoned.

BACKGROUND OF THE INVENTION

1. Field of the Invention

The present invention is concerned with a method for producing amorphous cordierite-forming glass from an organometallic precursor. Amorphous cordierite ($Mg_2Al_4Si_5O_{18}$) formed by the method of the present invention can be used to produce thin ceramic films or sheets which are useful in forming multilayer electronic devices. The present invention also provides a method f producing amorphous compositions comprising two major components wherein one of the two major components is an oxide of silicon.

2. Background Art

The synthesis of glasses and metal oxides from organometallic precursors (often referred to as sol-gel technology) has been of great interest to the ceramics industry in recent years. The first organometallic-derived metal oxides were produced about 45 years ago as coatings; see Reichspatent 736411 (1939) to W. Geffcken and E. Berger. In 1971, H. Dislich disclosed that multicomponent oxides could be synthesized by hydrolysis of metal alkoxides by the sol-gel process, in which the alkoxides are dissolved in an organic solvent, reacted with water, and condensed to a fine particulate oxide; see H. Dislich, Angew. Chem. Int. Ed. Eng. 10, 363 (1971). Refractory oxides derived from organometallic precursors, such as stabilized zirconia from alkoxides have been synthesized by K. S. Mazdiyasni et al., as described in both K. S. Mazdiyasni et al., Journal of the American Ceramics Society 50, 532 (1967) and K. S. Mazdiyasni, Ceramics International 8, 42 (1982).

The synthesis of metal oxides is not confined to degradations of alkoxide precursors. The amorphous citrate process, in which metal citrates are mixed in aqueous solution, dehydrated to a gel, and pyrolyzed to an oxide has been demonstrated for synthesis of numerous metal oxides. See: Ph. Courty et al., "Mixed Oxides and Oxide Solid Solutions in Highly Dispersed Form Obtained Through Pyrolysis of Amorphous Organic Precursors, Powder Technology 7, 21 (1973); M.S.G. Baythoun et al., "Production of Strontium-substituted Lanthanum Manganite Perovskite Powder by the Amorphous Citrate Process", Journal of Materials Science 17, 2757 (1982); and D. J. Anderton et al., "Production of Conducting Oxide Powders by Amorphous Citrate Process", Powder Metallurgy 1, 14 (1979). In addition, Hirano has developed a synthesis of spinel ferrites from metal acetylacetonates, which is in pilot scale production in Japan; see S. Hirano et al, "Preparation and Properties of Mn,Zn-Ferrite Fine Particles by Hydrolysis of Organo-Metallic Compounds", American Ceramic Society Bulletin 61, 362 (1982) and Y. Suwa et al., "Preparation of Spinel Ferrites by Hydrolysis of Metal Acetylacetonates" Proceedings of the International ICF, 3rd (48TRAI) 1980 (Pub. 1982), 23–26.

Ferrimagnetic spinels have been synthesized by both the hydrolysis of metal acetylacetonates (See U.S. Pat. No. 4,486,401 to Arons et al.) and by the amorphous citrate process (See U.S. Pat. No. 4,473,542 to L. D. David).

The advantages of synthesizing ceramics from organometallics are: (1) Ultrafine, submicron particles, with extraordinary surface area and sinterability can be obtained using specialized process conditions. (2) Syntheses take place at low temperatures, as much as 1000° C. lower than in conventional processes. This suppresses gross grain and particle growth, phase separations, and losses of volatile oxides. Kinetically stable phases not possible using other methods of synthesis become accessible. (3) Molecular level mixing is achieved by the mixing of molecular precursors in solution prior to the hydrolysis step (in the hydrolysis of metal alkoxides, acetylacetonates, etc.). Thus, homogeneous mixed oxides are much more easily made. (4) Multicomponent oxide compositions not obtainable by mixing, ball-milling, and melting together thermally incompatible starting materials can be achieved by organometallic precursor methods. (5) Amorphous or ultrafine crystalline ceramics are desirable in that sintering of the powder can be induced at temperatures far below that which would cause catastrophic grain growth. Organometallic-derived ceramic powders fill this need.

There is a need for methods of synthesis of fine, equiaxed, homogeneous particles of cordierite-forming glasses of both the $\alpha$ and the $\mu$ phases. Such powders are desirable for thin film redistribution applications in glass-ceramic substrate packaging of electronic devices and for insulation applications in semiconductor structures in general.

The synthesis of multioxide compositions, contrary to some assertions in the literature, is extremely complex. Areas of particular difficulty include the following:

(1) The burnout of carbonaceous residues must occur before pore closure in the incipient glass-ceramic. Gels derived with a cordierite target composition can act like molecular sieves in reforming organic products of hydrolysis. Oxidation can manifest itself as a dehydrogenation of a carbon-oxygen bond, forming an aldehyde, which decarbonylates to carbon monoxide and an alkane. The carbon monoxide can then disproportionate on the catalytic oxide surface to carbon plus carbon dioxide, and the alkane can conceivably dehydrogenate as well. Any synthesis of cordierite must suppress this carbon formation. Carbon residue can adversely affect the dielectric constant of the ceramic. It can also act as a standoff between individual particles, inhibiting sintering.

(2) Multicomponent precursors may hydrolyze at different rates, leading to phase separations in the dial product. One synthesis approach has been to hydrolyze double alkoxide precursors to homogeneous two-component perovskites and spinels. Another approach has been to utilize a mixed acetylacetonate-alkoxide precursor, as Hirano has done in ferrite syntheses.

(3) W. Holand et al., Journal Non-Crystalline Solids 48, 205 (1982), reported that during an attempt to synthesize cordierite from organometallic precursors, phase separations occurred above 600° C. when the product was held for 24 hours at those temperatures. The reported synthesis employed alkoxide precursors of $SiO_2$ and $Al_2O_3$ and magnesium acetate as the MgO source. This alkoxide approach is therefore unsuitable for making cordierite-forming glasses for thin film redistribution (TFR) applications.

Y. Ozaki, Japanese Kokai Patent No. Sho 57(1982)-88075, reported the synthesis of cordierite from organometallic sources. Separate organometallic-derived sols of magnesium, aluminum, and silicon oxides were mixed, agitated, and cast into thin films. These films, however, passed through the spinel-β-cristobalite phases between 600° and 1200° C., and did not transform to cordierite until above this temperature. Only at 1300° C. was the single-phase cordierite obtained This high temperature was not much of an improvement over current melt-synthesis temperatures (1600° C.), and firing a glass-ceramic/copper conductor system, typical of those used for packaging in the semiconductor industry, at that temperature is not feasible either.

It is known in the art, as described in U.S. Pat. Nos. 4,234,367 to L. W. Herron et al., 4,301,324 to A. H. Kumar et al., and 4,340,436 to D. J. Dubetsky, that the addition of boron and phosphorous to the cordierite crystalline structure alters the coefficient of expansion of the structure. The crystalline structure absent boron and phosphorus is $\mu$ phase, and presence of these elements results in the formation of $\alpha$ phase structure. The coefficient of expansion of the $\mu$ phase cordierite is about $33 \times 10^{-7}/°C$. to about $35 \times 10^{-7}/°C$., whereas the coefficient of expansion of pure $\alpha$ phase crystalline cordierite is about $5 \times 10^{-7}$ to about $7 \times 10^{-7}/°C$.

The coefficient of expansion of $\alpha$ cordierite-containing ceramic produced by the method of the present invention, described below, is about $25 \times 10^{-7}/°C$. due to the amount of glassy phase present. Since this latter coefficient of expansion is very close to the coefficient of expansion of silicon (about $25 \times 10^{-7}/°C$.), there are obvious advantages to use of this latter form of $\alpha$ phase cordierite in semiconductor applications.

SUMMARY OF THE INVENTION

In accordance with the present invention, a method is provided for synthesizing amorphous cordierite-forming glasses from organometallic precursors. Either the sol-gel/β-diketonate technique or the amorphous chelating hydroxycarboxylate process can be employed advantageously.

Amorphous, cordierite-forming glasses comprise a composition corresponding to the formula:

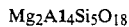

This formula need not be exactly obeyed, since cordierite will still form, even if the composition is off stoichiometry; cordierite plus amorphous phases form on crystallization.

The sol-gel/β-diketonate method of forming the amorphous, cordierite-forming glasses comprises:

(1) forming an organic solvent solution containing β-diketonates of magnesium (Mg) and aluminum (Al), wherein the molar ratio of the β-diketonate of Mg to the β-diketonate of Al ranges from about 1:1 to about 2:5. A β-diketonate of a metal has the general structure:

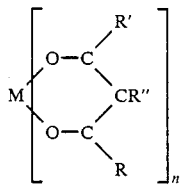

wherein, M=a metal and n=the valence of the metal, R=CH$_3$, alkyl, aryl, or CF$_3$; R'=CH$_3$, alkyl, aryl, or CF$_3$; and R''=H, CH$_3$, alkyl, aryl, or CF$_3$. The organic solvent must dissolve the β-diketonates, and any solvent is suitable for dissolution which is water-miscible. Examples of organic solvents which can be used include tetrahydrofuran, ethanol, methanol, glycol ethers, dimethylsulfoxide, dimethylformamide, dimethylacetamide, and the like. The solution of the β-diketonates in the organic solvent is prepared at a temperature ranging from about 25° C. to about 100° C. It is preferred, but not necessary, to add the β-diketonate to the solvent, for ease of solution. The solution is stirred and refluxed in an atmosphere which may or may not be inert, at a temperature ranging from about 25° C. to about 150° C. for a period ranging from about 1 hour to about 4 hours. This mixing and refluxing permits the β-diketonate ligands to form bridges between dissimilar metals, ensuring molecular-level mixing.

(2) Adding to the solution the stoichiometric amount of tetraethoxysilane, Si(OC$_2$H$_5$)$_4$ necessary to obtain the amorphous cordierite. Note that the hydrocarbon moiety attached to the oxygen need not be ethyl; any alkyl or aryl group can be used so long as the resulting silane is still soluble in the chosen solvent. Tetraethoxysilane (TEOS) was used in the reduction to practice of the present invention, because it is one of the less expensive silanes, and it is not toxic like Si(OCH$_3$)$_4$. The TEOS dissolves as it is added to the solution.

(3) Reacting the organic solution including the dissolved TEOS with a reagent capable of hydrolyzing the TEOS. A typical reagent includes, for example, aqueous dilute nitric acid, dilute hydrochloric acid, dilute hydrobromic acid, dilute hydroiodic acid, dilute hydrofluoric acid, dilute acetic acid, dilute sulfuric acid and the like, which is added slowly to the solution. Bases such as ammonium hydroxide cannot be used, because incomplete hydrolysis of the TEOS occurs, which results in carbon retention in subsequent calcining process steps. The hydrolysis reaction causes a clear yellow sol to form. A typical concentration range for the dilute hydrolysis reagent ranges from about 0.01 weight % to about 5 weight %. The resultant sol is reflux reacted for a period ranging from about 2 hours to about 24 hours.

(4) The organic solvent is stripped from the sol to yield a dry gel. The organic solvent can be removed using rotary evaporation, freeze-dry techniques, or spray drying. Spray drying is preferred because it eliminates the need for subsequent size reduction prior to pyrolysis. (5) The dry gel is then heated in an inert atmosphere, such as nitrogen, or in an oxidizing atmosphere such as air, to a temperature as high as about 700° C., to burn off carbonaceous residues. A typical burn off cycle would comprise heating the dry gel in air at a rate of about 5° C. per minute to a temperature of about 225° C.; holding this temperature for a time period ranging from about one to about 4 hours, to permit outgassing; and, then heating the dry gel in air to about 500° C. to about 700° C. for a time period ranging from about 2 hours to about 36 hours. The preferred maximum temperature for the burn off cycle is about 600° C. If step (4) is done using other than spray dry or freeze dry techniques, this heat-treated product may need to be reduced to a fine powder prior to pyrolysis. The pyrolysis to temperatures ranging as high as about 700° C. completes removal of carbon and produces a fine, amorphous powder of the empirical formula Mg$_2$Al$_4$Si$_5$O$_{18}$. The powder resulting from the above method of production is comprised of equiaxed particles, some of which are 10 micrometers in diameter, but the bulk are 4 micrometers or less in diameter, with no hard agglomerates.

When step (4) is done using the spray dry technique, the amorphous powder consists of particles ranging from about 60Å to about 80Å, agglomerated into 800–1,000Å clusters, which further agglomerate into 0.5–4 μm super clusters. X-Ray diffraction patterns of this powder reveal no lines whatsoever, which indicates that the material is amorphous, far more amorphous than commercially available cordierite. Typical yield obtained using the method of the present invention ranges from about 55% to about 95%; wherein a yield of about 80% to 95% is obtained when spray drying is used in step (4).

This sol gel method can be extended to form nearly any glass composition containing $SiO_2$ as a component. One need only find the appropriate β-diketonate precursors, add them to the TEOS or equivalent silane to the solution and perform the synthesis herein disclosed. For example, to add zirconia, one would add zirconium acetylacetonate, $Zr(acac)_4$, in the appropriate stoichiometric amount to the described synthesis. The method can be used in the formation of two component glasses also. The stoichiometric amount of TEOS is added to the organic solution, and the remainder of the synthesis process is as described above. There is an exception when borosilicate glasses $B_2O_3$- $SiO_2$ are synthesized using a sol gel technique. In the case of the borosilicate glasses, the typical precursor is an ester, $B(OR)_3$ (rather than a β diketonate), where R=methyl, ethyl, propyl or other substituent alkyl, a substituent aryl group, or $CF_3$. When the boron ester is used, it is necessary to place the TEOS in solution and hydrolyze the TEOS prior to adding the boron ester.

The amorphous chelating hydroxycarboxylate method of producing the amorphous, cordierite-forming glasses comprises:

(1) Forming an aqueous solution of chelating hydroxycarboxylates of magnesium and aluminum. Suitable chelating hydroxycarboxylates include citrates, maleates, tartrates, lactates esters of glycolic acid, and the like. For purposes of simplicity, the remainder of this discussion will refer to citrates, the preferred embodiment, however it is understood the method is not limited to citrates.

An aqueous solution of stoichiometric quantities of magnesium and aluminum citrates is formed. The citrates are added to water at temperatures ranging from about room temperature to 100° C. under agitation, and a solution forms in about 15 minutes. (2) Adding to the citrate solution a stoichiometric amount of tetraethoxysilane (TEOS). Note that the hydrocarbon moiety attached to the oxygen affects the solubility of the silane in the citrate solution. Increased molecular weight of the hydrocarbon moiety attached to the oxygen of the silane reduces the solubility of the silane in the citrate solution. $Si(OCH_3)_4$ and $Si(OC_2H_5)_4$ are preferred, with $Si(OC_2H_5)_4$ being most preferred, due to its lower toxicity. The TEOS can be added directly to the aqueous solution, or the aqueous citrate solution can be added to the TEOS. The receiving composition is agitated during the addition, to create what is believed to be discrete globules of TEOS surrounded by the aqueous solution (3) Reacting the aqueous solution containing the TEOS with a reagent capable of hydrolyzing the TEOS. Such reagents include, for example, aqueous dilute nitric acid, dilute hydrochloric acid, dilute hydrobromic acid, dilute hydroiodic acid, dilute hydrofluoric acid, dilute acetic acid, dilute sulfuric acid and the like. Preferred weight concentrations for the dilute acids range from about 0.01% by weight to about 20% by weight. The dilute acid is added slowly, for example, dropwise into the reactor at a temperature ranging from about 25°C. to about 100°C. The hydrolysis of the TEOS and the polymerization of the magnesium and aluminum citrates with the hydrolyzed TEOS is believed to occur at the interface between the hydrolyzed tetraethoxysilane and the aqueous solution.

(4) The resultant solution is then evaporated down to a thick oil, which further polymerizes to a gelatin on standing. The evaporation can be carried out at ambient pressure or can be done in vacuo to speed the evaporation rate. Typically the evaporation is carried out over a temperature ranging from about 50° C. to 180° C. over a time period from about 4 hours to 24 hours. The gelation occurs on standing for a period ranging from about 2 hours to about 8 hours.

(5) The gelatin is then pyrolyzed using a temperature ramp of about 5° C. per minute, beginning at about 25° C. and continuing to temperatures as high as about 700° C. The entire pyrolysis is carried out in an oxidizing atmosphere. The pyrolysis produces a fine, white, amorphous $Mg_2Al_4Si_5O_{18}$. X-ray analysis of the powder produced by the above method shows the powder to be amorphous, and transmission electron microscopy shows no crystalline islands such as those observed during analysis of cordierite produced using the Holand-Plumat-Duvigenaud method. The powder is disperse in particle size, ranging from about 50 Å to about 20 micrometers in size. The morphology is equiaxed. It is possible to improve the sphericity of the particles and to refine the size range by spray drying or freeze drying the sol to achieve evaporation of the solvent, and then pyrolyzing the resultant spray dried or freeze dried product. Surfactants can be used to enhance sphericity of the resultant powders if direct evaporation of the sol is used.

It is believed this amorphous chelating hydroxycarboxylate method can also be extended to form nearly any glass composition containing $SiO_2$ as a component. One need only find the appropriate chelating hydroxycarboxylate precursor to the desired metal oxide and add it to the stoichiometric amount of TEOS, and perform the synthesis outlined above. For example, to add zirconia, in the citrate embodiment, one would use ZrOcitrate or $Zr_3(citrate)_4$ in the appropriate stoichiometric amounts.

Amorphous, cordierite-forming glasses synthesized by the sol gel technique of the present invention, combined with spray dry removal of the organic solvent, exhibit a particle size ranging from about 50 Å to about 80 Å, which are loosely held in agglomerates of about 800 Å to 1000 Å in size. These cordierite-forming glasses can be placed into a formulation comprised of a binder, the amorphous powder, and a solvent, and spin cast upon a substrate to create a thin film on that substrate. The cast film is subsequently sintered to produce a dense film. In addition, it is possible to cast sheets of the formulation described, laminate the sheets, and fire the laminate to produce a sintered body. The mean particle size and particle size range of the cordierite-forming glasses which can be obtained using the method of the present invention is particularly important for producing of thin film layers. Without such particle size control, pores form within the cast film upon sintering, which result in a low strength material.

In addition, the purity of metal oxides obtained using the method of the present invention prevents inclusions in the crystalline structure which can serve as stress points upon application of a strain to the cast sintered film. Impurities also affect the dielectric constant, crystalline behavior, and general charge transfer characteristics of the crystalline structure, so that their control is critical.

The small, uniform particle size and the homogeneity of the amorphous, corderite-forming glasses synthesized using the method of the present invention also permit uniform sintering. As the crystalline phase begins to form, sintering stops and it is not possible to sinter to theoretical density, as desired in order to obtain preferred electrical and mechanical properties of the film. The high surface area particles obtained by using the synthesis method of the present invention results in improved sintering kinetics. The uniform particle shape permits formation into closely packed configurations prior to sintering. The homogeneity of the metal oxides composition facilitates uniform rates of sintering throughout a cast film, reducing void formation. The high purity of the corderite-forming glasses avoids nucleation of crystallization upon sintering due to the presence of impurities in the synthesis. Thus it is possible to form crystalline, cordierite-comprised films of one micron or less in thickness which have the desired mechanical, physical, and electrical properties, using the amorphous cordierite synthesized by the method of the present invention.

Once the amorphous, glassy cordierite is synthesized, it is sintered and crystallized to provide a corierite which is m phase in structure. This material exhibits a coefficient of expansion of about $33 \times 10^{-7}$ to about $35 \times 10^{-7}$ and a dielectric constant of about 5. As previously stated, it is known that the addition of boron and phosphorus during the synthesis of the amorphous cordierite, results in the formation of $\alpha$ phase structure upon crystallization. The $\alpha$ phase- containing material exhibits a coefficient of expansion of about $25 \times 10^{-7}/°C.$, which more closely approaches the coefficient of expansion of silicon, also about $25 \times 10^{-7}/°C.$, thus making the $\alpha$ material more useful in semiconductor applications. It has been discovered it is possible to introduce boron and phosphorous into the synthesis method of the present invention and still maintain particle size, uniformity, and a homogeneous composition of the amorphous cordierite.

When the sol-gel technique is used to produce the amorphous cordierite, boron or phosphorous can be added to the cordierite matrix by two methods. Phosphorous is introduced into the system by using phosphoric acid to hydrolyze the TEOS, or by the addition of a trialkyl-phosphate ester to the organic solution prior to hydrolysis. Boron is introduced to the system by using boric acid to hydrolyze the TEOS or by addition of a boron alkoxide to the hydrolyzed organic solution, followed by hydrolysis of the boron alkoxide. When the amorphous citrate technique is used to produce the amorphous cordierite, the same techniques can be used to introduce boron or phosphorous. It is possible to introduce up to about 20 mole % of the boric oxide or about 20 mole % of phosphorous pentoxide into the amorphous cordierite-forming glass. To produce $\alpha$ cordierite-forming glass, a combination of the oxides is used. When this combination of oxides is used, the combined concentration of boric oxide and phosphorus pentoxide can be as much as 12% by weight of the cordierite-forming glass. Typically the combined concentration ranges from about 1% by weight to 7% by weight. Neither the $P_2O_5$ nor $B_2O_3$ produced by the method herein disclosed will be lost from the resultant cordierite glass during pyrolysis, due to the low pyrolysis temperatures at which the amorphous cordierite is prepared.

DESCRIPTION OF THE PREFERRED EMBODIMENTS

$\beta$-Diketonate Precursors, Example 1

Figure 2:
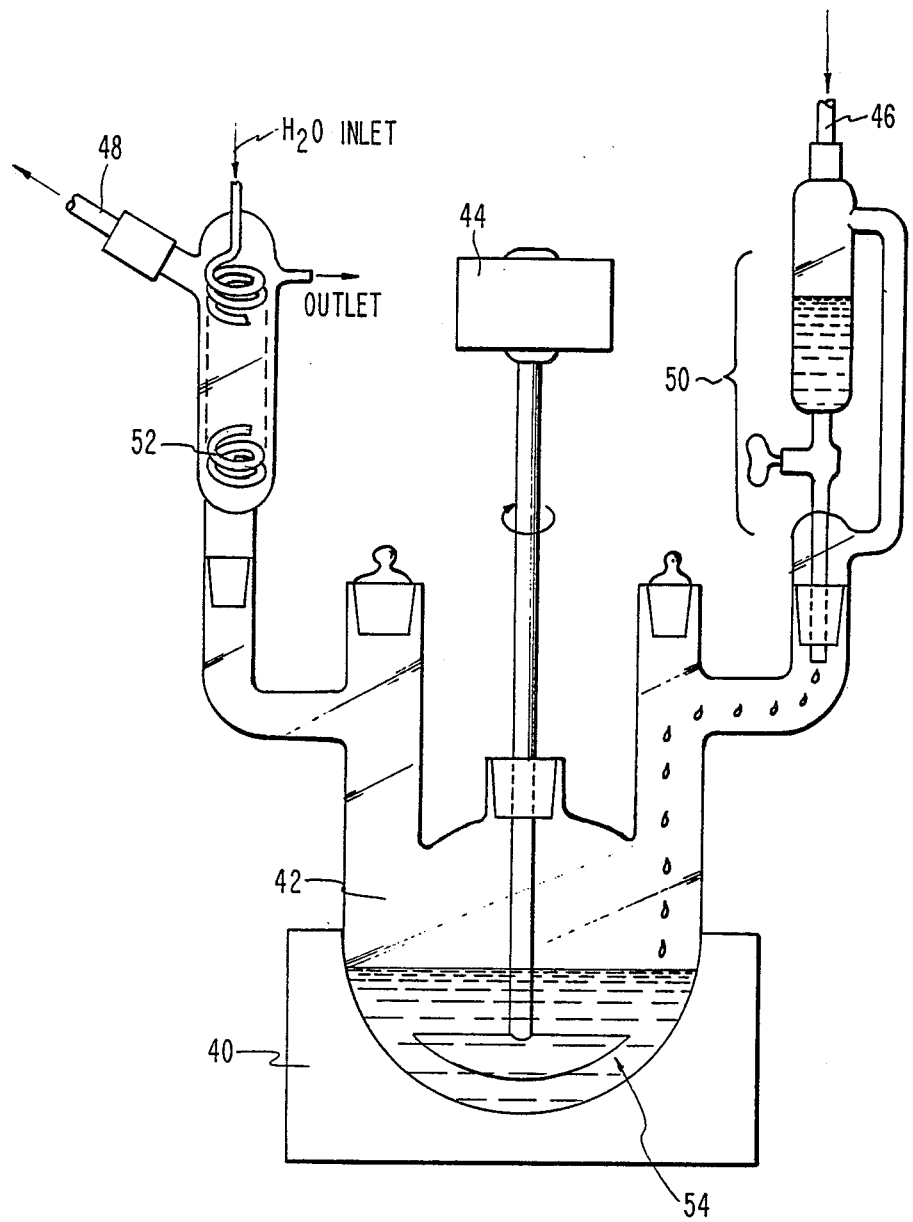
FIG. 2 illustrates the reaction system used to produce the amorphous cordierite-forming glasses from organometallic precursors in the laboratory. This drawing is used as an aid in describing the process, and is in no manner intended to be a limitation on the type of equipment which could be used to produce the amorphous cordierite-forming glasses in a manufacturing environment.

Fifty-two and two one-hundredths gram of magnesium acetylacetonate, $Mg(acac)_2 \cdot 2H_2O$ from Noah Chemical, (0.2 mole Mg); 129.94 gram of aluminum acetylacetonate, $Al(acac)_3$, from Noah Chemical, (0.4 mole Al) and 115 milliliters of TEOS from Alfa Ventron, (0.5 mole Si), were dissolved in 975 ml of ethanol. The reaction vessel was a 2-liter, 3-necked, round-bottomed flask 42 fitted with a motor stirrer 44, reflux condenser 52, dropping funnel 50, and gas inlet 46 / outlet 48, as shown in FIG. 2. The amber solution 54 was refluxed by applying heat from a heating mantle 40 to the flask 42 and by purging the apparatus with nitrogen, which was fed into inlet 46 and removed from outlet 48, so as to sweep the reflux away from the dropping funnel 50 and against the condenser 52. After two hours of reflux, 200 milliliters of 4% by weight aqueous $HNO_3$ (an amount estimated to be 100 times more than necessary) was added dropwise, through the dropping funnel 50, over a 30 minute period. As the sol was formed, the solution thickened considerably. The sol was refluxed for about two more hours and then allowed to cool.

The solution was stripped of solvent, via evaporative techniques such as boiling the solution dry on a hot plate or in a vacuum oven, to leave a yellow-white powder. This powder was placed in alumina boats in a tube furnace, and the temperature in the furnace was increased at a rate of about 5° C. per minute, in a flow of nitrogen, to about 500° C., at which the powder was held for about one hour. The blackened powder was withdrawn from the oven and ground using a Pulverisette for about 10 minutes. The powder was reinserted into the alumina boats and placed back in the tube furnace, in air, and the temperature of the furnace was gradually increased at a rate of about 5° C. per minute up to about 700° C., at which the powder was held overnight. This process yielded a white powder with the characteristics: amorphous, equiaxed, and about 50Å to 20 micrometers, loosely agglomorated particles of cordierite-forming glasses. Typical yield from the above synthesis has been about 91%.

Additional cordierite-forming glasses have been prepared by this method, wherein the solvent was stripped from the sol using commercially available spray drying techniques. When spray drying is used, it is not necessary to use a grinding step. Spray drying yields powders of 60–80Å double agglomerated equiaxed particles, as previously described. Note also that the heat treatment of the yellow-white precursor powder can be carried out entirely in air as previously described.

CITRATE PRECURSORS, EXAMPLE 2

Seventy-five and nineteen one-hundredths gram of magnesium citrate from Noah Chemical, (0.5 mole Mg); 216.08 gram of aluminum citrate from Noah Chemical, (1.0 mole Al); and 261.38 gram (280 milliliters) of TEOS from Alfa Ventron (1.25 mole Si) were weighed and proportioned out. The citrates were dissolved in 1900 milliliters of distilled water in a beaker which was agitated using a motor stirrer. Heat and further agitation was provided by immersion in an ultrasonic bath. The solution clarified upon the quick addition of the TEOS. Preliminary hydrolysis of the TEOS was accomplished over about a 2.5 hour time period, in a covered vessel, at a temperature of about 60° C., with agitation provided by both stirring and sonication.

After the preliminary hydrolysis reaction, 100 milliliters of 20% $HNO_3$ (aqueous, a 100 times excess of the calculated necessary amount) was added dropwise over a 5 minute period. The sol produced was stirred and sonicated, in an open vessel, for about 20 more hours at about 60° C. Boiling occurred, so that the solution was reduced to about 1500 milliliters of syrupy amber colored liquid. The syrupy liquid was allowed to stand overnight during which a gelatin was formed. The polymerization which occurred during formation of the gel was irreversible; no amount of water could disperse the gelatin into a clear sol.

The gelatin was dehydrated by drying it at 150° C. in air, and then in a vacuum oven. This dried, crusty substance was then ground in a Pulverisette mill for about 15 minutes. The ground material was placed in alumina boats which were positioned in a tube furnace in which the temperature was increased at a rate of about 5° C. per minute, in air, to about 700° C. The 700° C. was maintained overnight. The resultant product was a white powder with the previously described characteristics with the exception that the average particle size ranged from about 0.01 micrometer to 10 micrometers. Typical yield using this process has been about 89.5%.

SPRAY DRYING TECHNIQUE, EXAMPLE 3

It has been discovered that spray-drying either aqueous citrates or acetylacetonate-derived sols affords unique, fine, monodisperse, equiaxed particulate powders. Spray drying is not a new technology, but, when combined with the β-diketonate or amorphous citrate process, yields unexpected results. When the $Mg(acac)_2$-$Al(acac)_3$-$Si(OC_2H_5)_4$ sol was spray-dried and pyrolyzed, 70Å equiaxed powders, which soft agglomerated due to their enormous surface energy, were obtained. No other method of synthesizing organometallic-derived cordierite-forming glasses is known to replicate this material. The powders can be cast and laminated or cold-pressed into pellets and air-fired to at least about 97% of theoretical density without exception. On a furnace ramp (heating rate) of about 5° C./minute, the powders began to sinter at about 800° C. and began to crstallize at about 900° C. This 100° C. window between the onset of sintering and the onset of crystallization allowed sintering to very nearly theoretical density before the onset of crystallization stopped densification.

Figure 3:
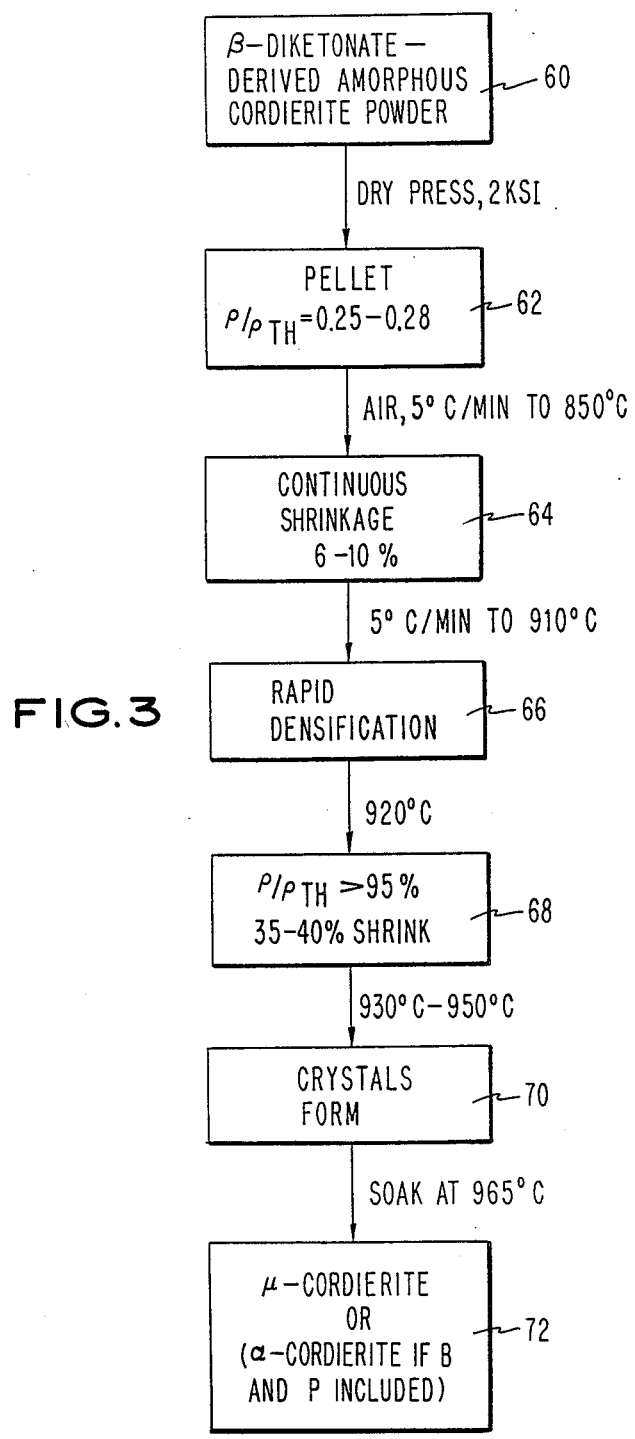
FIG. 3 is a flow diagram illustrating sintering and densification for the fine amorphous cordierite-forming glass obtained using the technique shown in FIG. 1A.
Figure 4:
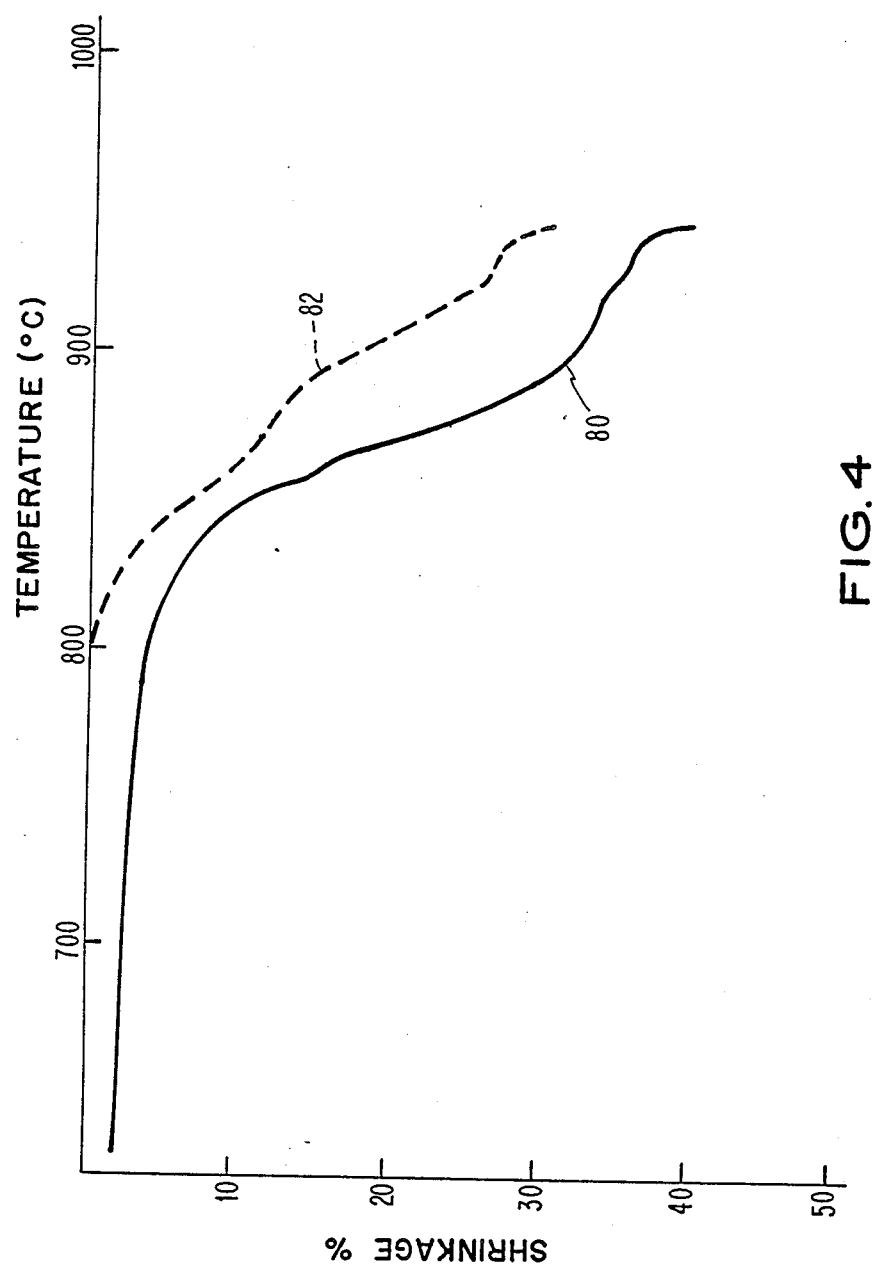
FIG. 4 illustrates the shrinkage observed over the sintering temperature range, in pellets derived from the cordierite-forming amorphous powders synthesized using the $\beta$-diketonate method.

FIG. 3 shows the sintering and densification of the β-diketonate derived amorphous powder to form either μ phase or α phase crystalline cordierite. The β-diketonate-derived amorphous powder 60 is dry pressed at about 2 KSI into pellets 62 wherein the ratio of actual density to theoretical density is about 0.25 to about 0.28. The pellets are heated in air to about 850° C. during which continuous shrinkage ranging from about 6% to 10% is observed 64. Subsequently, the temperature is increased to about 910° C. at which rapid densification is observed 66. Continued temperature increase to 920° C. provides a ratio of actual density to theoretical density greater than 95% 68. At a temperature ranging from about 930° C. to about 950° C. crystals begin to form 70. A heat soak at temperatures about 965° C. or greater provides crystalline cordierite, of μ phase, or of a α phase if boron and phosphorus oxides are present in the β-diketonate-derived amorphous (cordierite) powder 72. The temperature at which shrinkage occurs in the above processing depends to some extent on whether the boron and phosphorous oxides are present. FIG. 4 shows the applicable densification curves wherein 80 represents a typical μ phase cordierite-forming glass and 82 represents a typical α phase cordierite.

The amorphous-citrate-produced sols, when spray-dried and pyrolyzed, produced powders of particulates about 10 times larger than the β-diketonates. This is ideal for some casting processes which utilize the amorphous cordierite. Sintering and crystallization behavior was the same as that described above.

FIVE COMPONENT SYSTEM, EXAMPLE 4

The acetylacetonate-derived process, as described above in the example, was extended to a five-component system, featuring boron and phosphorus, which were incorporated via their respective alkoxides.

One hundred and one and one-hundredths grams of magnesium acetylacetonate $Mg(acac)_2$, 98.9 grams of aluminum acetylacetonate $Al(acac)_3$ and 111 ml of TEOS were dissolved in 2,000 ml of ethanol. To this solution were added 10 ml of $OP(OC_2H_5)_3$. This solution was hydrolyzed as described previously. Subsequently, 7 ml of $B(OC_4H_9)_3$ was added to the solution and hydrolyzed. After formation of a sol, the sol was spray dried, and pyrolysis of the resultant product was as described in EXAMPLE 1. About 1 weight % $B_2O_3$ and about 3 weight % $P_2O_5$ were measured with respect to the final amorphous cordierite-forming glass produced.

The overall composition of a typical five-component product comprises the oxides of MgO, $SiO_2$, $Al_2O_3$, $P_2O_5$ and $B_2O_3$, wherein the total weight % of MgO, $SiO_2$, $Al_2O_3$ ($Mg_2Al_4Si_5O_{18}$) ranges from about 93% by weight to about 99% by weight of the total composition. Compositions comprised of the above exhibit the desired phases and the desired ranges of coefficient of expansion, as previously described.

The resultant product was identical in particle morphology to the three-component system, and the sintering performance was identical. This 5-component system, comprising: Mg(acac)$_2$-Al(acac)$_3$-SiOR)$_4$-B(OR)$_3$—OP(OR)$_3$ yielded α-phase cordierite on crystallization, whereas, the 3-component system comprising: Mg(acac)$_2$Al(acac)$_3$-Si(OR)$_4$ yielded μ phase cordierite on crystallization.

Figures 1A, 1B:
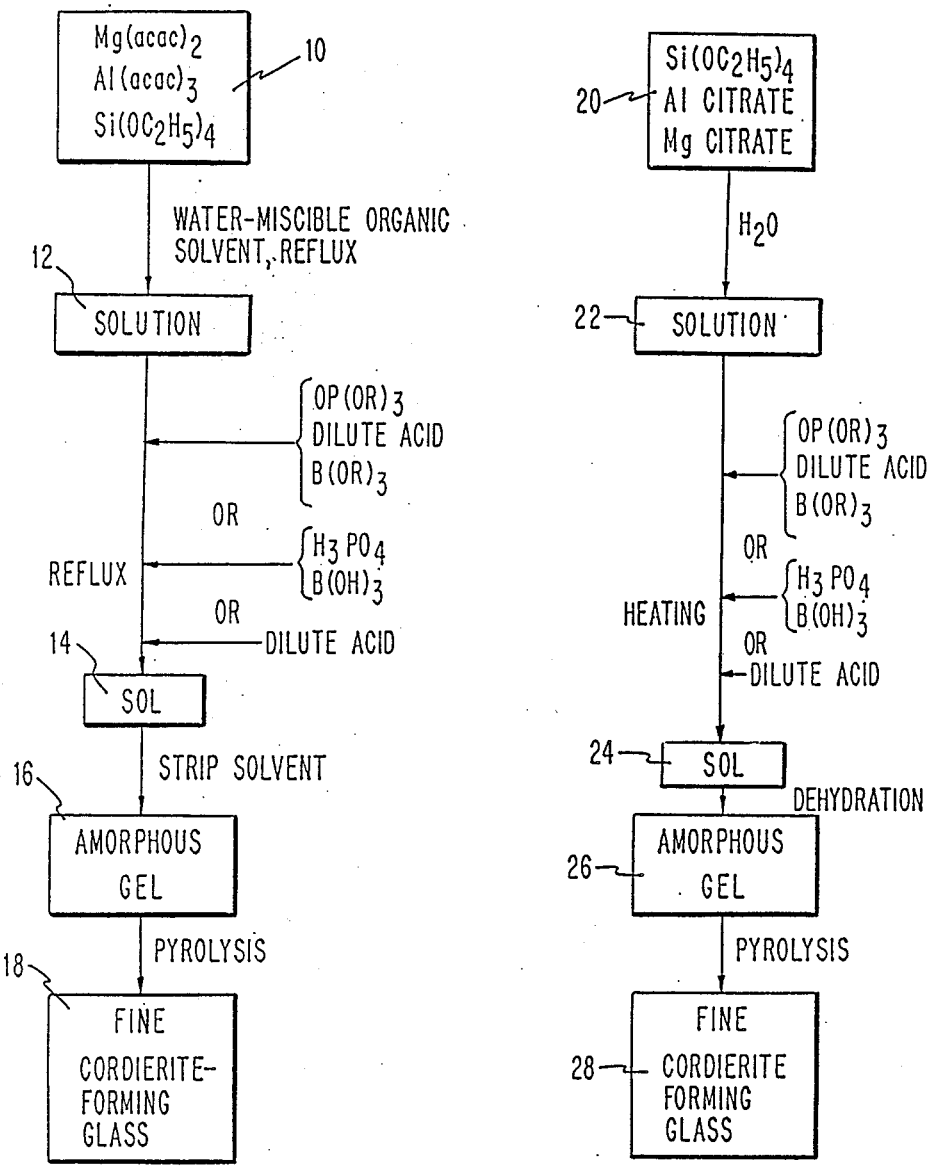
FIGS. 1A and 1B are flow diagrams showing the organometallic syntheses of cordierite-forming glasses. 1A shows the $\beta$-diketonate method, and 1B shows the amorphous citrate embodiment of the chelating hydroxycarboxylate process.

It is believed the α-phase cordierite can be obtained by introducing boron and phosphorus into the amorphous citrate process as shown in FIG. 1B.

TWO COMPONENT SYSTEM, EXAMPLE 5

Two component systems such as MgO-SiO$_2$, Al$_2$O$_3$—SiO$_2$, B$_2$O$_3$- SiO$_2$ and ZrO$_2$-SiO$_2$ can also be synthesized by the method of the present invention. The metal oxide other than silicon is in the form of a β-diketonate in the case of the sol-gel process or a citrate in the case of the amorphous citrate process. When boron-containing cordierite-forming glasses are synthesized, it is necessary to use a boron ester precursor in place of a β-diketonate in the two component system. In this latter case, borosilicate glass has been produced using triethyl borate precursor.

One hundred fifty-six ml. of tetraethoxy silane (TEOS, 0.7 mole) was dissolved in 2,200 ml of ethanol. The solution was hydrolyzed with 200 ml of deionized water which contained 2 ml of 40 weight % nitric acid. The solution was warmed to about 79° C. and refluxed. After about 4 hours of refluxing, 102.1 ml of triethyl borate (0.6 mole) was added to the solution dropwise. This maintained a clear solution. The solution was refluxed approximately an additional 4 hours and then spray dried to form a fine white powder which was calcined in air at an oven temperature ramp of about 5° C./minute to a temperature of about 470° C. The yield was 48 grams, about 88.5% yield based on the TEOS starting material, and was comprised of about 80 mole % SiO$_2$ and about 20 mole % B$_2$O$_3$.

It is required that the TEOS be hydrolyzed first in the above synthesis. The maximum amount of B$_2$O$_3$ which can be incorporated into the SiO$_2$ using this method is about 22 mole %. Thus, the ratio of B(OR$_3$): Si(OR$_4$) in the synthesis solution can be lowered to 1:2 and still yield a similar product.

Only the preferred embodiments of the invention have been described in the above examples, and one skilled in the art will recognize that numerous substitutions, modifications and alterations are permissible without departing from the spirit and scope of the invention, which is demonstrated in the following claims.

What is claimed is:

1. A method of producing amorphous powders comprising cordierite-forming glasses, wherein the method comprises: (a) forming an aqueous or organic solution having an aqueous or organic solvent, respectively, and containing at least two precursors of said amorphous powders comprising cordierite, wherein said precursors are β-diketonates of magnesium and aluminum or chelating hydroxycarboxylates of aluminum and magnesium; (b) adding to said solution a silane; (c) adding to said solution a reagent capable of hydrolyzing at least said silane wherein said precursor components, said silane, and said hydrolyzing reagent undergo a polymerization reaction; (d) stripping from said aqueous or organic solution the aqueous or organic solvent, leaving a residue; (e) pyrolyzing said residue to produce a fine, amorphous powder comprised of amorphous cordierite-forming glass.

2. The method of claim 1 wherein said solution is organic and said precursors of said cordierite-forming glasses are comprised of a β-diketonate of magnesium, and a β-diketonate of aluminum.

3. The method of claim 2 wherein said β-diketonates are of the general structure

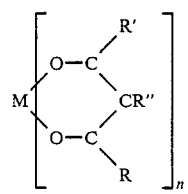

wherein M is magnesium or aluminum and n is 2 for magnesium or 3 for aluminum, and wherein R=CH$_3$, alkyl, aryl, or CF$_3$; R'=CH$_3$, alkyl, aryl, or CF$_3$, and R''=H, CH$_3$, alkyl, aryl or CF$_3$.

4. The method of claim 2 or claim 3 wherein said organic solution solvent is water-miscible.

5. The method of claim 4 wherein said organic solution solvent is selected from the group consisting of tetrahydrofuran, ethanol, methanol, glycol ethers, dimethylsulfoxide, dimethylformamide, dimethylacetamide, and mixtures thereof.

6. The method of claim 1 wherein said solution is aqueous and said precursors of said cordierite-forming glasses are comprised of chelating hydroxycarboxylates of aluminum and magnesium.

7. The method of claim 6 wherein said chelating hydroxycarboxylate is selected from the group consisting of citrates, maleates, tartrates, lactates and esters of glycolic acid.

8. The method of claim 5 wherein said silane is selected from the group consisting of alkoxysilanes of the general formula Si (OR)$_4$, wherein R is any alkyl or aryl group, and wherein the alkoxysilane is soluble in said organic solution solvent.

9. The method of claim 8 wherein said silane is tetraethoxysilane.

10. The method of claim 8 wherein said hydrolyzing reagent is comprised of a dilute acid selected from the group consisting of HNO$_3$, HCl, HBr, HI, HF, CH$_3$COOH, H$_2$SO$_4$, and sulfonic acids.

11. The method of claim 2, wherein said solvent is stripped from said solution using spray drying techniques.

12. The method of claim 8, wherein said solvent of said solvent or water of said aqueous solution is stripped using spray drying techniques.

13. The method of claim 12, wherein said pyrolyzing is carried out in two steps comprising: heating said gel in an inert atmosphere to a temperature as high as about 500° C., followed by heating the resultant partially pyrolyzed material in an oxidizing atmosphere to a temperature as high as 700° C.

14. The method of claim 12 wherein said pyrolyzing is carried out in an oxidizing atmosphere to a temperature as high as 700° C.

15. The method of claim 8 wherein combinations of phosphorous and boron oxides are introduced into said cordierite-comprising powders by using phosphoric acid and aqueous boric acid as said hydrolyzing reagents.

16. The method of claim 8 wherein combinations of phosphorus oxides and boron oxides are introduced into said cordierite-forming glass comprising powders by adding phosphorous alkoxides to said organic or said aqueous solution, hydrolyzing said organic or said aqueous solution containing said phosphorous alkoxides, and then adding boron alkoxides to said organic or said aqueous solution.

17. The method of claim 1 wherein said solution is aqueous and said precursors of said cordierite components are comprised of magnesium citrate and aluminum citrate.

18. The method of claim 17 wherein said silane is selected from the group consisting of alkoxy silanes of the general formula Si(OR)$_4$, wherein R is any alkyl or aryl group which permits said silane to remain soluble in said aqueous solution.

19. The method of claim 18 wherein said silane is tetraethoxysilane.

20. The method of claim 19 wherein said hydrolyzing reagent is a dilute acid.

21. The method of claim 17 or claim 20, wherein said aqueous solvent is stripped from said solution using spray drying techniques.

22. The method of claim 21 wherein said pyrolyzing is carried out in an oxidizing atmosphere to temperatures as high as 700° C.

23. The method of claim 17 wherein combinations of phosphorous oxides and boron oxides are introduced into said cordierite-forming glass comprising composition by using phosphoric acid and aqueous boric acid hydrolyzing reagents.

24. The method of claim 17 wherein combinations of phosphorous oxides and boron oxides are introduced into said cordierite-forming glass comprising composition by adding phosphorous alkoxides to said aqueous solution, hydrolyzing said phosphorous alkoxide containing aqueous solution, and then adding boron alkoxides to said aqueous solution.

25. A method of producing a glassy, amorphous powder comprising two components, wherein one of said two components is an oxide of silicon, wherein the method comprises: (a) forming an aqueous or organic solution having an aqueous or organic solvent, respectively, and containing one non-silicon-containing precursor of said amorphous composition, wherein said precursor is a β-diketonate of magnesium, aluminum or boron or a citrate of magnesium or aluminum; (b) adding to said solution a silane; (c) adding to said solution a reagent capable of hydrolyzing said silane wherein said non-silicon-containing precursor component, said silane, and said hydrolyzing reagent undergo a polymerization reaction; (d) stripping from said aqueous or organic solution the aqueous or organic solvent using spray drying techniques, leaving a residue; (e) pyrolyzing said residue to produce a fine, amorphous powder comprised of a two component amorphous composition wherein one of said two components is an oxide of silicon.

26. The method of claim 25 wherein said solution is organic and said one non-silicon-containing precursor is comprised of a β-diketonate of the general structure

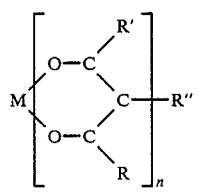

wherein M is magnesium or aluminum or boron, and n is a number equal to the valence of M, and wherein R=CH$_3$, alkyl, aryl, or CF$_3$; R'=CH$_3$, alkyl, aryl, or CF$_3$; and R''=H, CH$_3$, alkyl, aryl, or CF$_3$.

27. The method of claim 25 or claim 26 wherein said organic solvent is water-miscible.

28. The method of claim 25 wherein said solution is aqueous and said one non-silicon-containing precursor is comprised of a citrate selected from the group consisting of magnesium citrate and aluminum citrate.

29. Amorphous cordierite-forming powders comprising two major components, wherein one of said two major components is an oxide of magnesium, aluminum, boron, phosphorus or mixtures thereof and wherein the particles are equiaxed and the mean particle size ranges from about 50Å to about 80Å which upon sintering, followed by crystallization, will produce cordierite.

30. The amorphous powders of claim 29 wherein said about 50Å to about 80Å particles are soft agglomarated into agglomerates ranging from about 800Å to about 5 micrometers in size.

31. The amorphous, cordierite-forming powders of claim 29 wherein said about 50Å to about 80Å particles are soft agglomerated into agglomerates ranging from about 800Å to about 1000Å in size.

32. Amorphous cordierite-forming powders of claim 29 which upon sintering, followed by crystallization, will form μ-phase cordierite.

33. Amorphous cordierite-forming powders of claim 29 which comprises boron oxides and phosphorous oxides, and which upon sintering, followed by crystallization, will form α-phase cordierite.

* * * * *